United States Patent
Toda et al.

(10) Patent No.: US 8,879,181 B2
(45) Date of Patent: Nov. 4, 2014

(54) READ/WRITE APPARATUS AND READ/WRITE METHOD

(71) Applicant: Kabushiki Kaisha Toshiba, Tokyo (JP)

(72) Inventors: Seiji Toda, Kawasaki (JP); Michio Yamamoto, Inagi (JP); Masakazu Kitahara, Kunitachi (JP); Masataka Shitara, Machida (JP); Takumi Kakuya, Ebina (JP); Kiyotaka Sasaki, Kawasaki (JP); Isao Fujita, Yokohama (JP); Satoru Adachi, Kawasaki (JP); Kenji Inoue, Kamakura (JP); Nobuhiro Sugawara, Yokohama (JP); Hironori Kanno, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/735,220

(22) Filed: Jan. 7, 2013

(65) Prior Publication Data

US 2014/0071559 A1 Mar. 13, 2014

(30) Foreign Application Priority Data

Sep. 7, 2012 (JP) ................. 2012-197721

(51) Int. Cl.
*G11B 27/36* (2006.01)
*G11B 19/04* (2006.01)
*G11B 5/012* (2006.01)
*G11B 20/18* (2006.01)

(52) U.S. Cl.
CPC ............... *G11B 5/012* (2013.01); *G11B 27/36* (2013.01); *G11B 19/045* (2013.01); *G11B 20/1879* (2013.01)
USPC ........................................................ 360/31

(58) Field of Classification Search
None
See application file for complete search history.

(56) References Cited

U.S. PATENT DOCUMENTS

| | | | | |
|---|---|---|---|---|
| 6,781,780 | B1 * | 8/2004 | Codilian | 360/60 |
| 7,345,837 | B1 * | 3/2008 | Schreck et al. | 360/31 |
| 7,463,441 | B2 | 12/2008 | Cho et al. | |
| 7,477,465 | B2 | 1/2009 | Yu | |
| 7,870,460 | B2 | 1/2011 | Iketaki et al. | |
| 7,974,029 | B2 * | 7/2011 | Tsai et al. | 360/31 |
| 8,300,350 | B2 * | 10/2012 | Kawabe | 360/77.02 |
| 8,320,067 | B1 * | 11/2012 | Tsai et al. | 360/31 |
| 8,331,053 | B2 * | 12/2012 | Hobbet | 360/60 |
| 8,411,386 | B2 * | 4/2013 | Hongawa et al. | 360/55 |
| 2005/0168859 | A1 | 8/2005 | Cho et al. | |
| 2006/0233077 | A1 | 10/2006 | Yu | |
| 2010/0165502 | A1 | 7/2010 | Iketaki et al. | |

FOREIGN PATENT DOCUMENTS

| | | |
|---|---|---|
| JP | 2003-044328 A | 2/2003 |
| JP | 2006-294231 A | 10/2006 |
| JP | 2010-152988 A | 7/2010 |
| JP | 2010-157287 A | 7/2010 |
| JP | 4733400 B2 | 4/2011 |
| JP | 2011-129213 A | 6/2011 |

* cited by examiner

*Primary Examiner* — K. Wong
(74) *Attorney, Agent, or Firm* — Knobbe Martens Olson & Bear LLP

(57) ABSTRACT

According to one embodiment, a read/write apparatus includes a receiver and a refresh module. The receiver receives a write command requesting a write to a magnetic disk. The refresh module refreshes, when a first area of the magnetic disk includes a second area corresponding to the write command, data written in a third area, the third area being an area obtained by excluding the second area from the first area.

12 Claims, 10 Drawing Sheets

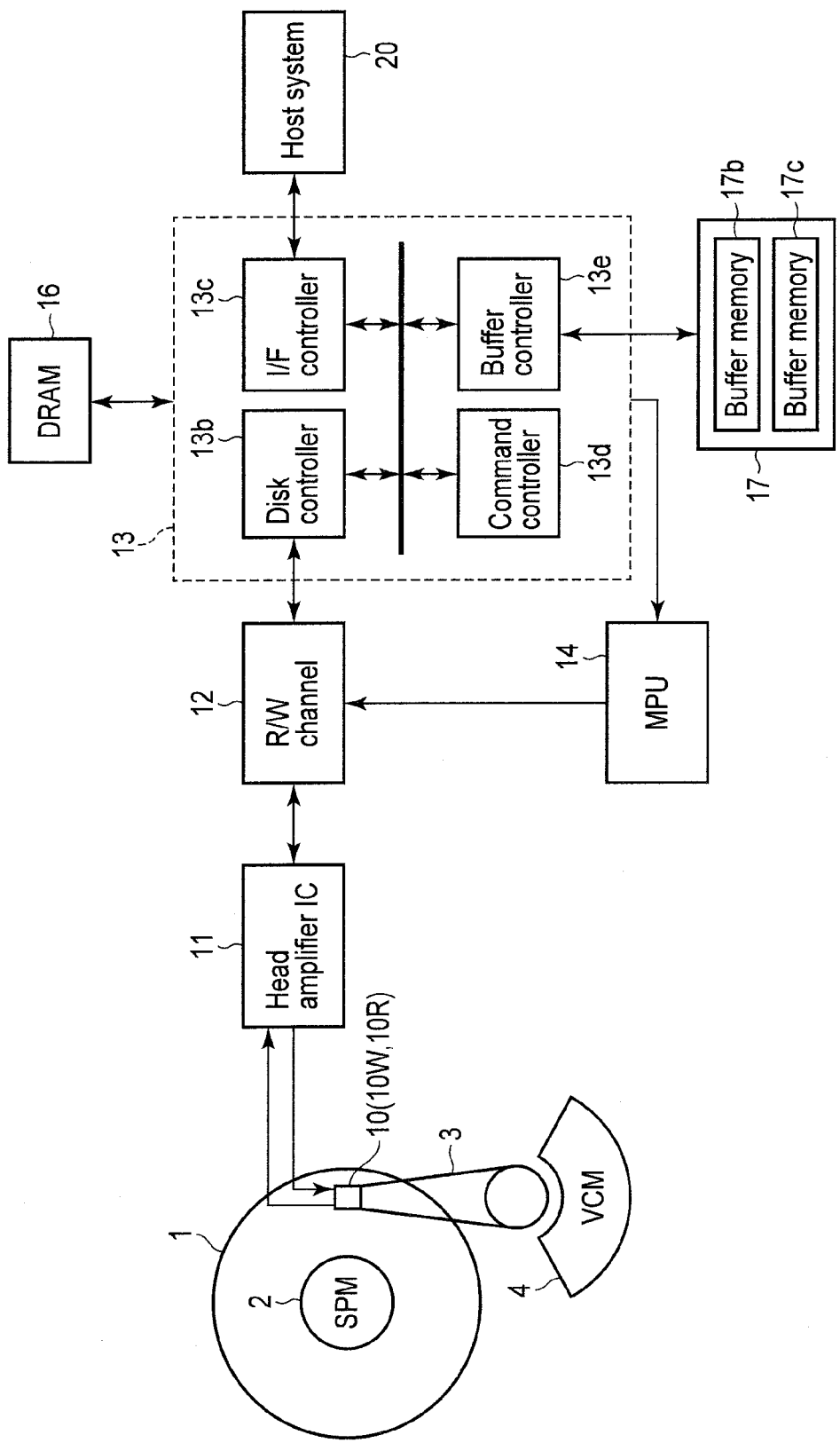
F I G. 1

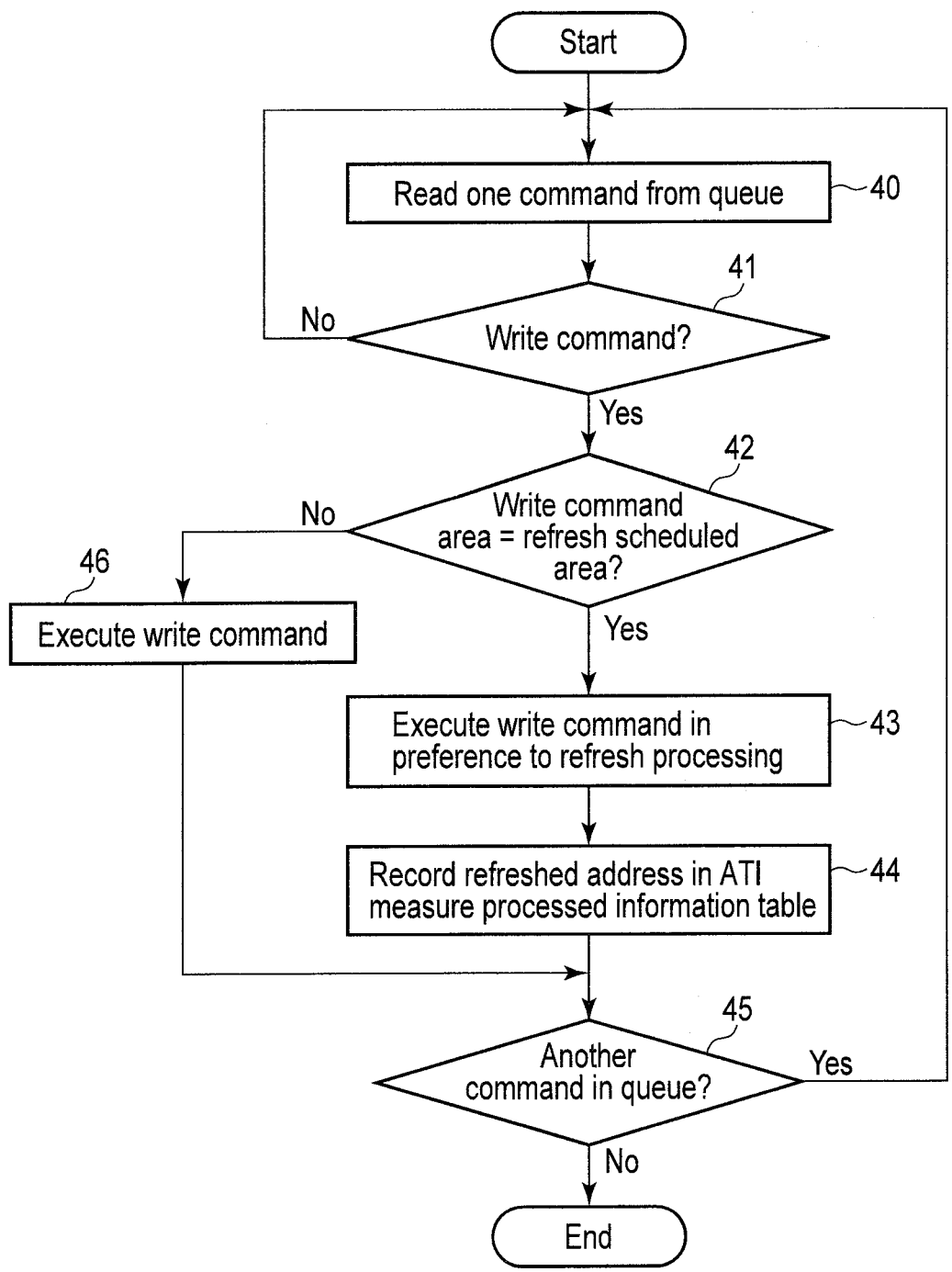
F I G. 4

READ/WRITE APPARATUS AND READ/WRITE METHOD

CROSS-REFERENCE TO RELATED APPLICATIONS

This application is based upon and claims the benefit of priority from Japanese Patent Application No. 2012-197721, filed Sep. 7, 2012, the entire contents of which are incorporated herein by reference.

FIELD

Embodiments described herein relate generally to a read/write apparatus and read/write method, which can read/write data.

BACKGROUND

In recent years, for a read/write apparatus such as a magnetic disk apparatus, which writes data, high-density data writing is required. By increasing a track density on a magnetic disk, data can be written at a high density.

However, by increasing the track density, a phenomenon in which data written as magnetic information in a neighborhood track of that on which data is written is not correctly read (ATI: Adjacent Track Interference) often occurs.

Hence, when the ATI occurred, data is read from the magnetic disk, and the read data is written again on the magnetic disk, thus refreshing the data. By executing a refresh, the data can be recovered.

However, when a refresh is required to be executed at the time of execution of a normal read/write, the refresh interrupts the normal read/write. Also, redundant unwanted processing is executed at the time of the refresh and normal read/write. For this reason, for example, a time required for the normal read/write is prolonged, thus lowering the performance of the magnetic disk apparatus.

BRIEF DESCRIPTION OF THE DRAWINGS

FIG. 1 is an exemplary block diagram showing an example of configuration of a magnetic disk apparatus according to a first embodiment.

FIG. 4 is an exemplary flowchart showing an example of a write command processing sequence in the ATI measure processing according to the first embodiment.

DETAILED DESCRIPTION

Figure 2:
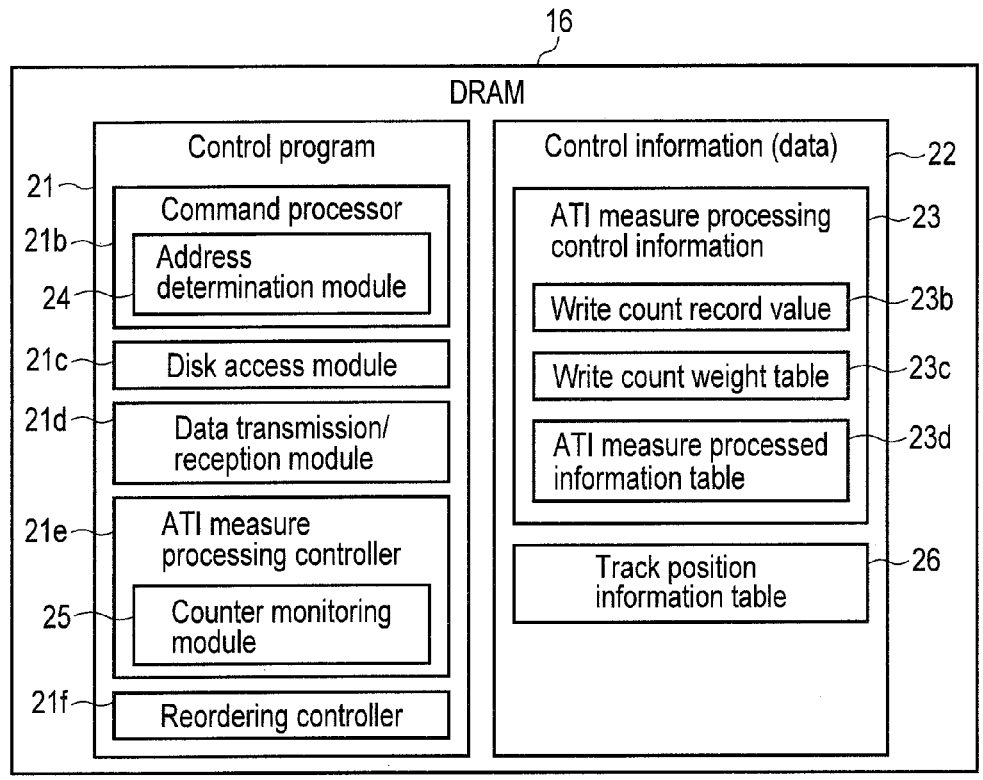
FIG. 2 is an exemplary diagram showing an example of configuration in a memory included in the magnetic disk apparatus according to the first embodiment.

In general, according to one embodiment, a read/write apparatus includes a receiver and a refresh module. The receiver receives a write command requesting a write to a magnetic disk. The refresh module refreshes, when a first area of the magnetic disk comprises a second area corresponding to the write command, data written in a third area, the third area being an area obtained by excluding the second area from the first area.

(First Embodiment)

The first embodiment will be described below with reference to the drawings.

FIG. 1 is a block diagram showing principal part of a magnetic disk apparatus according to this embodiment.

As shown in FIG. 1, the magnetic disk apparatus roughly includes an HDA (Head-Disk Assembly), head amplifier integrated circuit (IC) 11, HDC (Hard Disk Controller) 13, and the like.

The HDA includes a magnetic disk 1 as a storage medium, a spindle motor (SPM) 2, an arm 3 which mounts a head 10, and a voice coil motor (VCM) 4. The magnetic disk 1 is rotated by the spindle motor 2. The arm 3 and VCM 4 configure an actuator. The actuator controls to move the head 10 mounted on the arm 3 to a designated position on the magnetic disk 1 upon driving the VCM 4.

The head 10 includes a write head 10W and read head 10R mounted on a slider as a main body of the head 10. The write head 10W writes data on the magnetic disk 1. The read head 10R reads data written in a data track on the magnetic disk 1.

The head amplifier IC 11 includes a preamplifier and write driver. The preamplifier amplifies a read signal read by the read head 10R, and transfers the amplified read data as read data to a read/write (R/W) channel 12. On the other hand, the write driver transfers a write current according to write data output from the R/W channel 12 to the write head 10W.

The R/W channel 12 includes a read channel to execute signal processing of read data, and a write channel to execute signal processing of write data.

The HDC 13 includes a disk controller 13b, I/F controller 13c, command controller 13d, and buffer controller 13e.

The disk controller 13b is connected to the R/W channel 12, and controls the magnetic disk 1.

The I/F controller 13c controls data transfer between a host system 20 and the R/W channel 12.

The command controller 13d executes control associated with a write command or read command received from the host system 20.

The buffer controller 13e is connected to a buffer 17, and executes control associated with data to be transmitted or received with the buffer 17. The buffer controller 13e temporarily stores, for example, data read from the magnetic disk 1, data to be written in the magnetic disk 1 in response to a write command, and the like in the buffer 17.

An MPU 14 is a main controller of the magnetic disk apparatus, and controls the VCM 4 to execute, for example, servo control for positioning the head 10.

Note that the R/W channel 12, HDC 13, and MPU 14 may be configured by a 1-chip integrated circuit.

A DRAM 16 stores a program which is read from the magnetic disk 1 and is required to control the magnetic disk 1, an ATI measure processing program, ATI measure processing information, and the like. Note that the DRAM 16 can be a memory used to store the program required to control the magnetic disk 1, ATI measure processing program, ATI measure processing information, and the like, and for example, a RAM such as an SRAM may be used. The program required to control the magnetic disk 1, ATI measure processing program, ATI measure processing information, and the like may be stored in the DRAM 16 and/or SRAM as firmware or data associated with firmware. ATI measure processing is that for preventing occurring unreadable data by executing refresh and read verify processes to hardly readable data due to the influence of the ATI before that data becomes unreadable, so as to recover the hardly readable data. For example, when a write count for each track is written, a "write count record" for all tracks is prepared, and when a write is performed for a predetermined track, a value of a "write count weight table" according to the distance from a written track is added to a value already record in the "write count record" in association with a range of tracks influenced by that write. The "write count weight table" indicates a distribution and the like of weights associated with adjacent tracks of a written track with reference to the written track. When the value of the "write count record" exceeds a predetermined value for any track, data of tracks around the track whose "write count record" value exceeds the predetermined value are refreshed.

The refresh includes a read of incorrect data due to the ATI and a write of the read data to the same location again. As for the write, for example, after the write of the refresh is performed, data which is written by the refresh may often be overwritten by data written by a normal read/write. As for the read, for example, after the read of the refresh is performed, data which is the same as that read by the refresh may be further read by a normal read/write. In this manner, when write instructions such as write commands received from a high-order system such as the host system 20 are concentrated on a specific area (range) of the magnetic disk 1, and when it is judged based on the write counts and the like that write quality lowers for an area adjacent to the area which undergoes the write, the refresh is executed.

Magnetic recording of tracks, for example, outside an area of tracks influenced by the ATI is often faded. The read verify is that for inspecting for a track whose write count record value exceeds a predetermined value whether or not magnetic recording is faded, and a rewrite of the refresh is required. More specifically, the read verify is that for performing a rewrite of the refresh to an unreadable track, a part of that track, or tracks around that track based on a read retry count indicating whether or not data in tracks around the written track can be successfully read.

The ATI measure processing may be that executed by firmware or the like.

The buffer memory 17 includes buffer memories 17b and 17c. The buffer memory 17 is connected to the buffer controller 13e. The buffer memory 17 stores data sent from the buffer controller 13e, and sends the stored data to the buffer controller 13e according to a control instruction from the buffer controller 13e. Note that the buffer memory 17 may be allocated in the DRAM 16.

An example of the configuration of the DRAM 16 will be described below with reference to FIG. 2.

The DRAM 16 includes a control program 21 and control information (data) 22.

The control program 21 includes a command processor 21b, disk access module 21c, data transmission/reception module 21d, ATI measure processing controller 21e, and reordering controller 21f.

The command processor 21b processes commands sent from the host system 20. The command include, for example, a write command which requests a write to the magnetic disk 1, and a read command required to read data from the magnetic disk 1.

The command processor 21b includes an address determination module 24. The address determination module 24 determines an LBA (Logical Block Address) of a data block corresponding to the received command. For example, when the address determination module 24 receives a plurality of write commands, it can determine, for example, whether or not respective LBAs designated by the plurality of write commands are continuous.

The disk access module 21c controls accesses to the magnetic disk 1 according to the ATI measure processing. For example, when the command controller 13d receives a write command, the disk access module 21c accesses the magnetic disk 1 so as to write data corresponding to this write command in the magnetic disk 1 in accordance with an instruction of the command processor 21b.

The data transmission/reception module 21d receives write data sent from the host system 20. The data transmission/reception module 21d transmits read data read from the magnetic disk 1 to the host system 20. Note that the write data is data written in the magnetic disk 1 in accordance with a write command. The read data is data read from the magnetic disk 1 in accordance with a read command.

When the ATI measure processing controller 21e compares a write count or the like with a predetermined threshold, and detects a track which is required to be refreshed, it executes control associated with the ATI measure processing so as to execute the refresh for an area excluding an execution range (write command area) of a write command group. The control associated with the ATI measure processing includes control for deciding, for example, an area to be refreshed on the magnetic disk so as not to lower the performance of the magnetic disk apparatus when the refresh is required due to the ATI, control for deciding whether or not the refresh is performed for the area, and the like. Note that the area includes, for example, a track, data sector, data block, and the like of the magnetic disk.

The ATI measure processing controller 21e includes a counter monitoring module 25. The counter monitoring module 25 monitors a track write count value for logical blocks of queued write command or read command. Also, the counter monitoring module 25 monitors whether or not the write count record value exceeds a predetermined threshold. When the write count record value exceeds the predetermined threshold, the counter monitoring module 25 executes processing required to execute the ATI measure processing. The ATI measure processing controller 21e determines based on the monitoring result of the counter monitoring module 25 whether or not the refresh is required when a write or read is performed according to a write command or read command to be received by the command processor 21b before the write or read according to the write command or read command to be received is performed. Furthermore, when the refresh is required, the ATI measure processing controller 21e can determine an area to be refreshed before a write or read according to a write command or read command to be received by the command processor 21b. Also, the ATI measure processing controller 21e has a function of performing read verify to a track group adjacent to a refreshed track. Note that an area to be refreshed will be described later with reference to FIG. 3.

The reordering controller 21f executes control for deciding a processing order of a plurality of commands received from the host system 20. The reordering controller 21f can change this order so as to continuously execute, for example, commands having closer LBAs of the plurality of commands. By executing commands having closer LBAs in turn, a time required to move the head 10 on the magnetic disk 1, for example, a seek time can be shortened.

The control information (data) 22 includes a write count record table 23b, write count weight table 23c, and ATI measure processed information table 23d as ATI measure processing control information 23.

The write count record table 23b records write counts to the magnetic disk 1 (write count counter value table), and the write count counter value table holds, for example, ATI influence ranges for all tracks. A write count in the magnetic disk 1 is recorded in the write count counter table for each track of the magnetic disk 1. Note that the write count is not limited to that for each track, but it may be recorded for each track part or for each block including a plurality of sectors of the magnetic disk 1. The write count record value 23b is used to determine whether or not to execute the refresh. For example, when a write count for a predetermined track exceeds a predetermined threshold, that track is refreshed.

The write count weight table 23c is used when a write count is recorded in the write count record value 23b. The write count weight table 23c stores, in the form of a table, weights each indicating a relationship between a degree of influence to surrounding tracks due to a write, and a distance between a written track and the track to be written. The write count weight table 23c is set with weights according to distances between a written track and a track to be written, for example, when a write count is recorded for each track. For example, a weight for the written track is "0", and is decreased with increasing distance from the written track. By setting weights in this way, a write count record value of a track which suffers stronger influence of the ATI becomes larger. For this reason, whether or not the refresh is required to be executed can be determined based on the write count record value 23b.

The ATI measure processed information table 23d stores information associated with the executed ATI measure processing. The information associated with the executed ATI measure processing is an address where the ATI measure processing was executed, or the like.

The control information 22 includes a track position information table 26. The track position information table 26 stores pieces of track position information associated with all logical blocks. When reordering is executed by the reordering controller 21f, the track position information table 26 can be used to determine, for example, tracks close to a track to be written.

The ATI measure processing according to the first embodiment will be described below with reference to FIG. 3. In the first embodiment, a range to be refreshed (to be referred to as a refresh area hereinafter) is adjusted in advance before the refresh, and the adjusted refresh area is refreshed. Note that the refresh area includes, for example, an LBA range of data blocks, a predetermined area on the magnetic disk 1, and the like to be refreshed.

Figure 3:
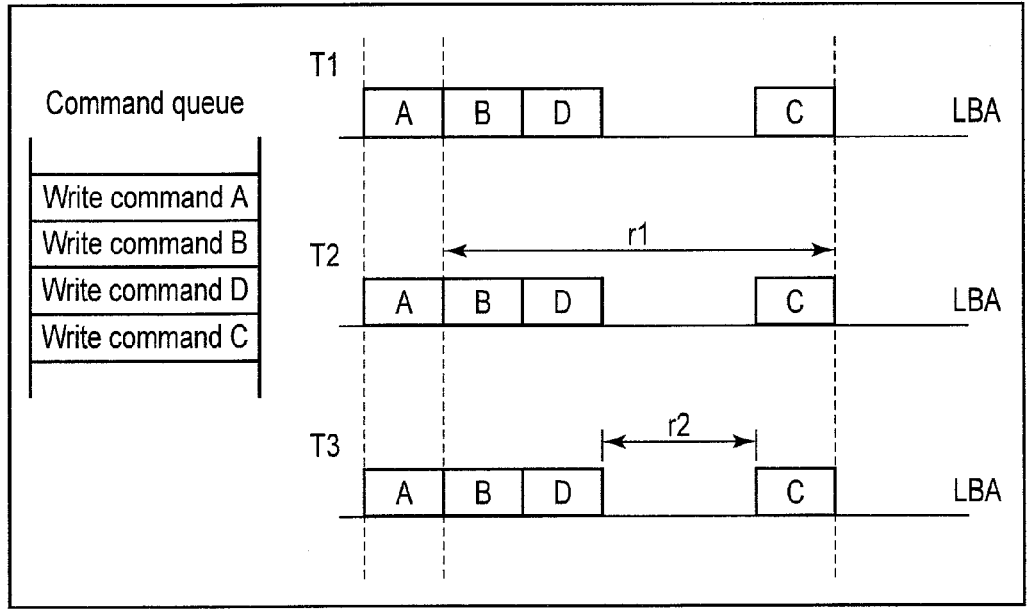
FIG. 3 is an exemplary view for explaining an overview of ATI measure processing according to the first embodiment.

More specifically, a case will be explained below wherein the magnetic disk apparatus receives write commands A to D, as shown in FIG. 3. Since write commands A to D are reordered, they are stored in a command queue so as to be executed in an order of write command A, write command B, write command D, and write command C.

The right view of FIG. 3 shows the positional relationship of LBAs corresponding to respective write commands, and time-serially shows a change in refresh area. Note that data of a write command means data to be written in a logical block for which the write command is executed.

T1 indicates a state before write commands A to D are executed. T2 indicates a state when write command A is executed. T3 indicates a state when write commands B to D are executed. In each of states T1 to T3, "A", "B", "C", and "D" shown in FIG. 3 indicate LBA positional relationships respectively corresponding to write commands A to D. "A", "B", "C", and "D" will be respectively referred to as command area A, command area B, command area C, and command area D according to command types hereinafter. In FIG. 3, these command areas are arranged in turn from the left in an order of command area A, command area B, command area D, and command area C. Note that an LBA corresponding to a write command will be referred to as a write LBA hereinafter, and that corresponding to a read command will be referred to as a read LBA hereinafter.

In the first embodiment, it is assumed a case in which command area B in the refresh area is adjacent to (contiguous with) command area D, as shown in FIG. 3. However, in the first embodiment, for example, command area B need not always be adjacent to command area D in the refresh area unlike those shown in FIG. 3.

T2 indicates a state when write command A is executed. Upon execution of write command A, an area to be refreshed, in other words, a scheduled area of the refresh (an area indicated by r1 in FIG. 3; to be referred to as a refresh scheduled area hereinafter) can be estimated. In FIG. 3, the refresh scheduled area r1 includes three write LBAs indicated by command area B, command area C, and command area D.

In the first embodiment, when the refresh scheduled area r1 includes write LBAs, the refresh scheduled area r1 is adjusted. To adjust the refresh scheduled area r1 is to reduce the refresh scheduled area r1. Then, for example, a time required for the refresh can be shortened.

More specifically, before the refresh is performed for the refresh scheduled area r1, write command B, write command C, and write command D are executed. An area for which a write command is executed will be referred to as a write command area hereinafter. Since the influence of the ATI disappears in a write command area immediately after data is written, it becomes an area which need not be refreshed.

A case will be assumed wherein the refresh is executed for the refresh scheduled area r1 before write command B, write command C, and write command D are executed. Data written in each write command area is read, and the read data is written again in that write command area by executing the refresh for the refresh scheduled area r1. In this case, by executing a write command for that write command area, write data is written in the write command area. In this way, write are performed twice for the write command area. That is, since a write command is executed after the refresh is executed, data written by the refresh is overwritten by data of the write command in the write command area. Therefore, as can be seen from the above description, the first refresh write processing is unnecessary processing.

T3 indicates a state after write command B, write command C, and write command D are executed. By executing write command before the refresh, the refresh scheduled area r1 becomes small, as indicated by a refresh area r2 in T3. In the first embodiment, this refresh area r2 is refreshed.

The ATI measure processing sequence to be executed in the first embodiment will be described below with reference to FIG. 4.

Initially, in block 40, one command is read out from the command queue.

Next, it is checked in block 41 whether or not the command read out from the command queue is a write command. If the read command is not a write command, the process returns to block 40, and one command is read from the command queue again. If the command read out from the command queue is a write command, the process advances to block 42.

It is checked in block 42 based on the write count record value 23b whether or not a write command area is a refresh scheduled area. The write command area is a refresh scheduled area when the write command area is included in the refresh scheduled area.

If the write command area is not a refresh scheduled area in block 42, the write command is executed. If the write command area is a refresh scheduled area in block 42, the process advances to block 43.

In block 43, the write command is executed in preference to the refresh. As described above with reference to FIG. 3, the write command is executed before execution of the refresh, thereby adjusting the refresh scheduled area by, for example, reducing that area.

Next, in block 44, an LBA indicating the write command area in the refresh scheduled area is recorded in the ATI measure processed information table 23d as the refreshed address.

It is checked in block 45 whether or not the command queue includes another write command. If the command queue includes another write command, the process returns to block 41, and it is checked again whether or not a write command area corresponding to a write command read out from the command queue is a refresh scheduled area. If the command queue does not include any write command, the ATI measure processing ends.

Figure 5:
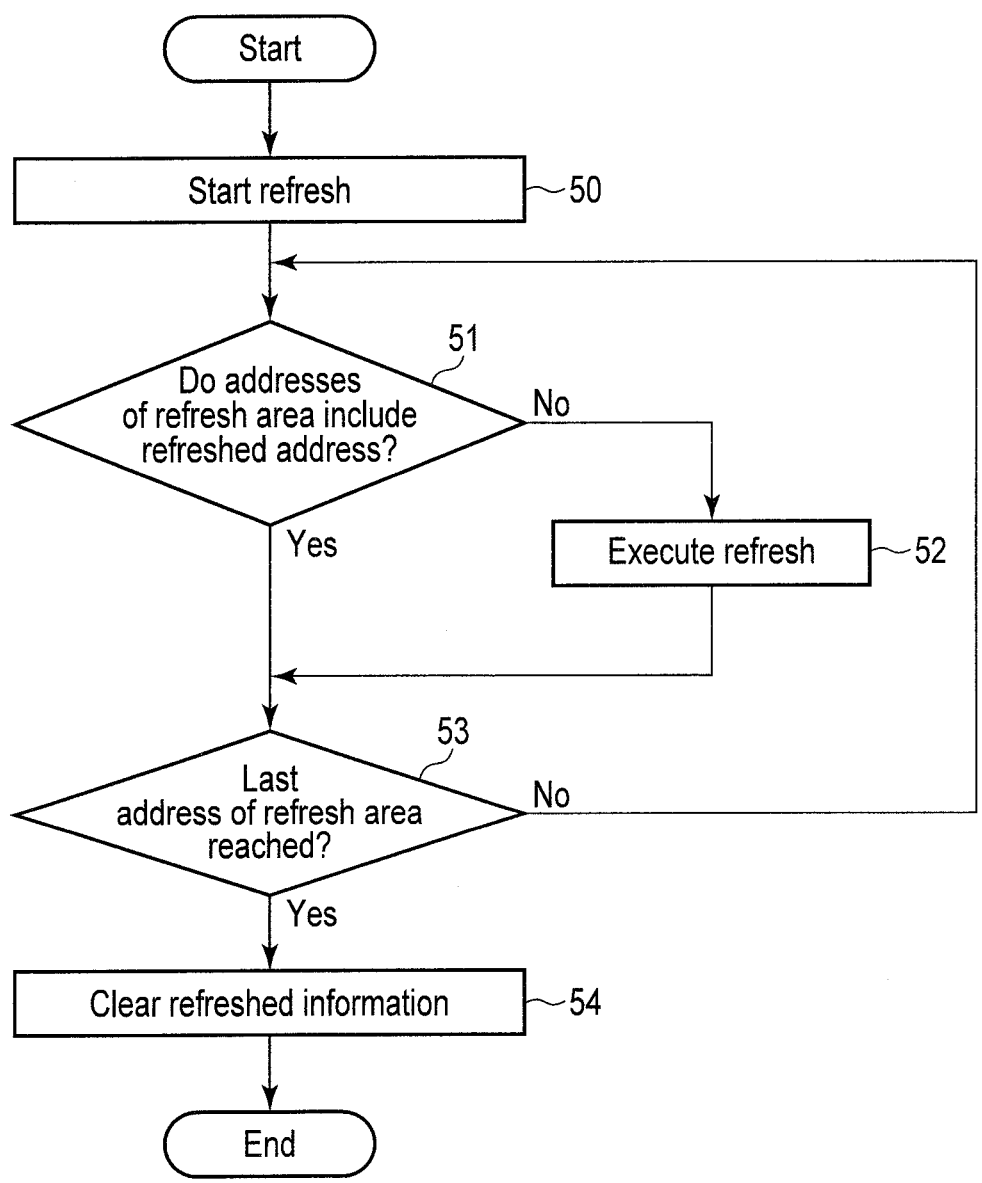
FIG. 5 is an exemplary flowchart showing an example of a refresh processing sequence in the ATI measure processing according to the first embodiment.

The refresh sequence according to the first embodiment will be described below with reference to FIG. 5.

In block 50, the refresh is started according to an instruction from the MPU 14 or the like.

It is checked in block 51 whether or not addresses of an area which is to undergo refresh write processing (to be referred to as a refresh write area hereinafter) include refreshed addresses. Note that the following description will be given under the assumption that the refresh write processing in FIG. 5 is executed in turn for respective addresses in an area which requires the refresh write processing. The refresh write area indicates the same area as a refresh area, and even when the refresh write area is different from a refresh area, the refresh write processing shown in FIG. 5 can be executed.

If the addresses of the refresh write area do not include refreshed address, the refresh write processing is executed for the refresh write area in block 52.

It is checked in block 53 whether or not the last address in the refresh write area has been reached. If the last address in the refresh write area has not been reached yet, the process of block 51 is executed for the next address in the refresh write area. If the last address of the refresh write area has been reached, the process advances to block 54.

In block 54, refreshed information is cleared. The refreshed information includes the refreshed address in the process of block 44 in FIG. 4, data of the refresh executed for the refreshed address, or the like.

Note that in the first embodiment the case in which command area B is adjacent to (contiguous with) command area D in the refresh area has been explained. However, in the first embodiment, it is applicable even when command area B is not adjacent to command area D in the refresh area.

As described above, according to the first embodiment, the number of times of the refresh to be executed can be reduced or an area to be refreshed can be small. Thus, the access performance of the magnetic disk apparatus (especially, write command processing performance) can be improved. When a refresh area includes continuous LBAs, the refresh area can be small. For this reason, a time required for the refresh can be shortened.

(Second Embodiment)

The second embodiment will be described below with reference to the drawings. Note that a description of the same components and functions as those in the first embodiment will not be repeated.

In the first embodiment, when a write LBA area is included in a refresh area, an area obtained by excluding the write LBA area from the refresh area is refreshed. In the second embodiment, when a write LBA area is included in a refresh area, read data read from the refresh area (to be referred to as read data for refresh hereinafter) and write data are merged, and the merged data is rewritten in the refresh area.

Figure 6:
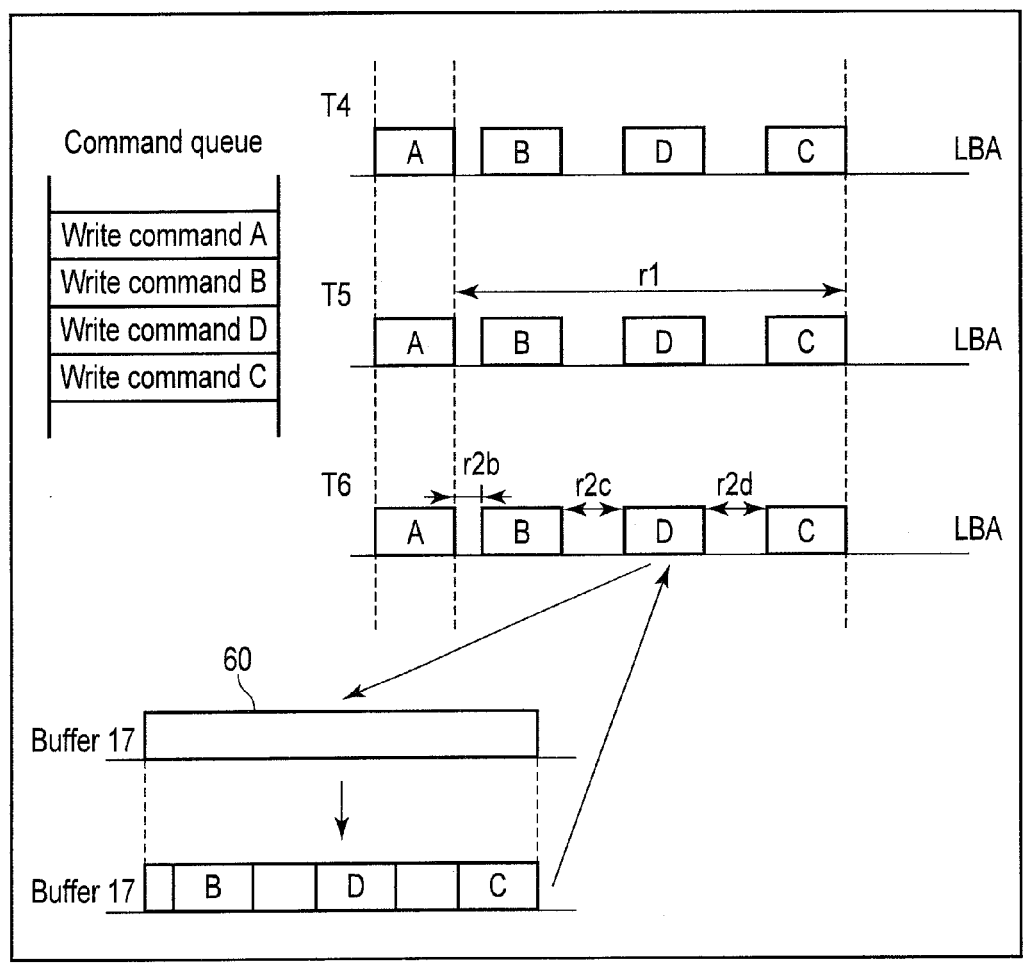
FIG. 6 is an exemplary view for explaining an overview of ATI measure processing according to a second embodiment.

The ATI measure processing according to the second embodiment will be described in detail below with reference to FIG. 6. In the second embodiment, it will be assumed a case in which a refresh area is divided into a plurality of areas (r2b, r2c, and r2d) by write command areas, as shown in FIG. 6.

T4 indicates a state in which any of four write commands stored in a command queue are not executed. Each of command area B, command area C, and command area D is nearly evenly spaced apart from each other.

T5 indicates a state in which write command A is executed. Upon execution of write command A, a refresh scheduled area r1 is estimated. Command area B, command area C, and command area D are included in the refresh scheduled area r1.

T6 indicates a state in which processes equivalent to write command B, write command C, and write command D are executed with execution of refresh in place of execution of write command B, write command C, and write command D in turn. In the second embodiment, read data 60 for refresh is read from the refresh scheduled area r1, and the read data 60 for refresh is written to the buffer 17. Then, data of the respective write commands are merged with corresponding locations of the read data 60 for refresh. Then, the merged data is written in the refresh area. In this manner, unnecessary write processes can be reduced, and the refresh and write command processes can be efficiently executed.

Figure 7:
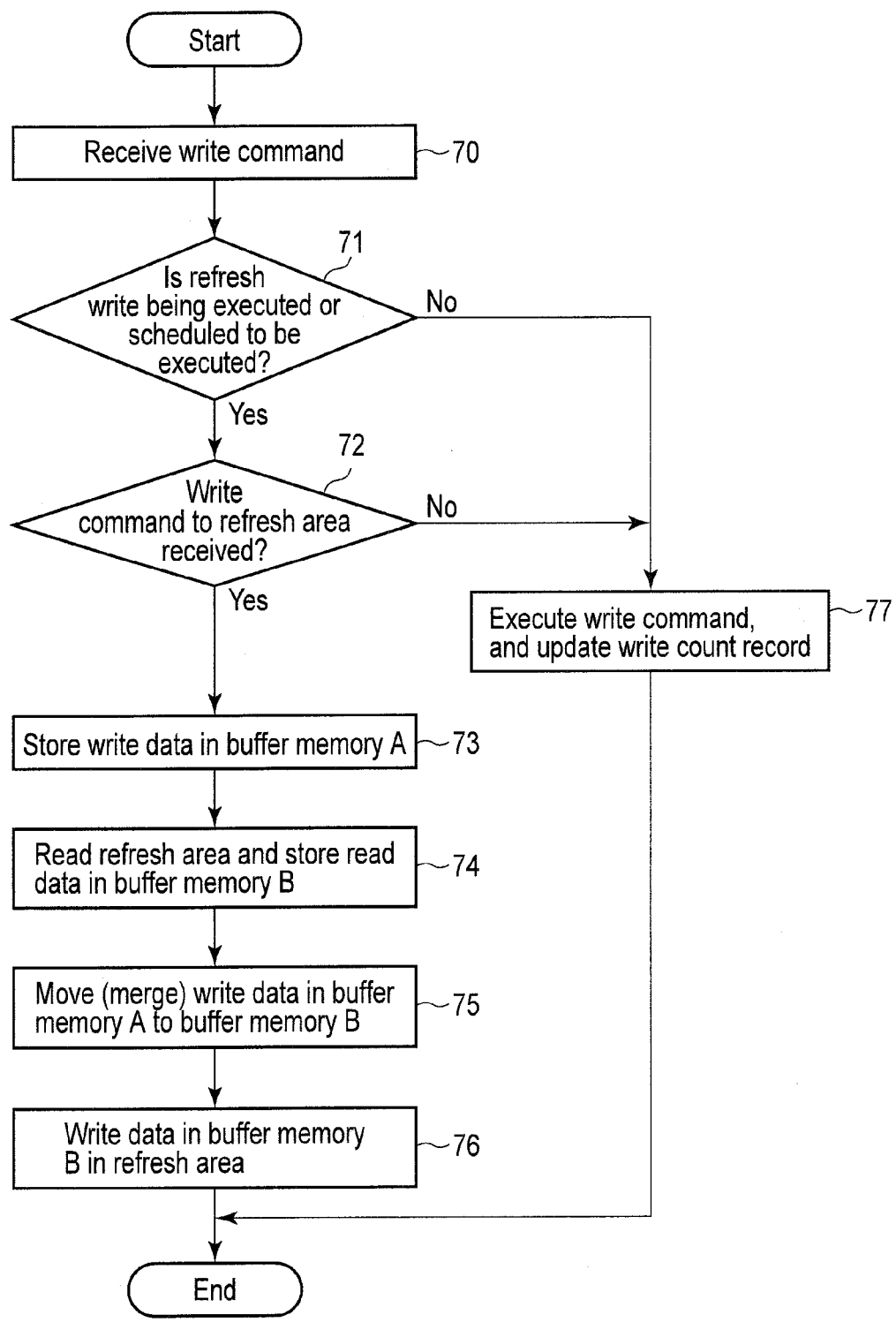
FIG. 7 is an exemplary flowchart showing an example of a write command processing sequence in the ATI measure processing according to the second embodiment.

The sequence of processing as a combination of the refresh rewrite and write command processes according to the second embodiment will be described below with reference to FIG. 7.

Initially, in block 70, a write command is received from the host system 20. Next, it is checked in block 71 whether or not refresh is being performed or is scheduled to be performed. If refresh is not performed or is not scheduled to be performed, the process advances to block 77 to update the write count record, thus ending the write processing.

If refresh is being performed or is scheduled to be performed, the process advances to block 72. It is checked in block 72 whether or not the write command is received for a refresh area. If write command is not received for a refresh area, the process advances to block 77. If the write command is received for a refresh area, the process advances to block 73, and write data is stored in buffer memory A (buffer memory 17b). In block 74, the refresh area is read, and read data is stored in buffer memory B (buffer memory 17c). Next, in block 75, the write data stored in buffer memory A is moved to buffer memory B (to merge data). In block 76, the merged data in buffer memory B is written in the refresh area.

Note that in the second embodiment, it has been explained the case in which each of command area B, command area C, and command area D in the refresh area is not adjacent to each other (they are not contiguous with each other). However, in the second embodiment, it is applicable even when a case in which command area B, command area C, and command area D in the refresh area are adjacent to each other.

As described above, according to the second embodiment, a refresh rewrite and write according to write commands can be simultaneously executed. For this reason, for example, unnecessary write to an identical area can be reduced. Especially, when refresh is required to be executed, the processing performance of write commands can be improved. In particular, when a plurality of write LBAs in a refresh area are not adjacent to each other, a seek time or the like can be shortened, thus shortening a time required for the refresh.

(Third Embodiment)

The third embodiment will be described below with reference to the drawings. Note that a description of the same components and functions as those in the first and second embodiments will not be repeated.

In the first and second embodiments, it has been explained the ATI measure processing upon reception of a write command. In the third embodiment, it will be explained ATI measure processing upon reception of a read command. In the third embodiment, read verify is executed as the ATI measure processing in addition to the refresh.

The read verify is processing for confirming if data written in the magnetic disk 1 can be normally read. Note that to normally read data means that data can be read without causing any read error.

When data cannot be normally read by the read verify, data stored in an area where the data cannot be normally read is refreshed.

Figure 8:
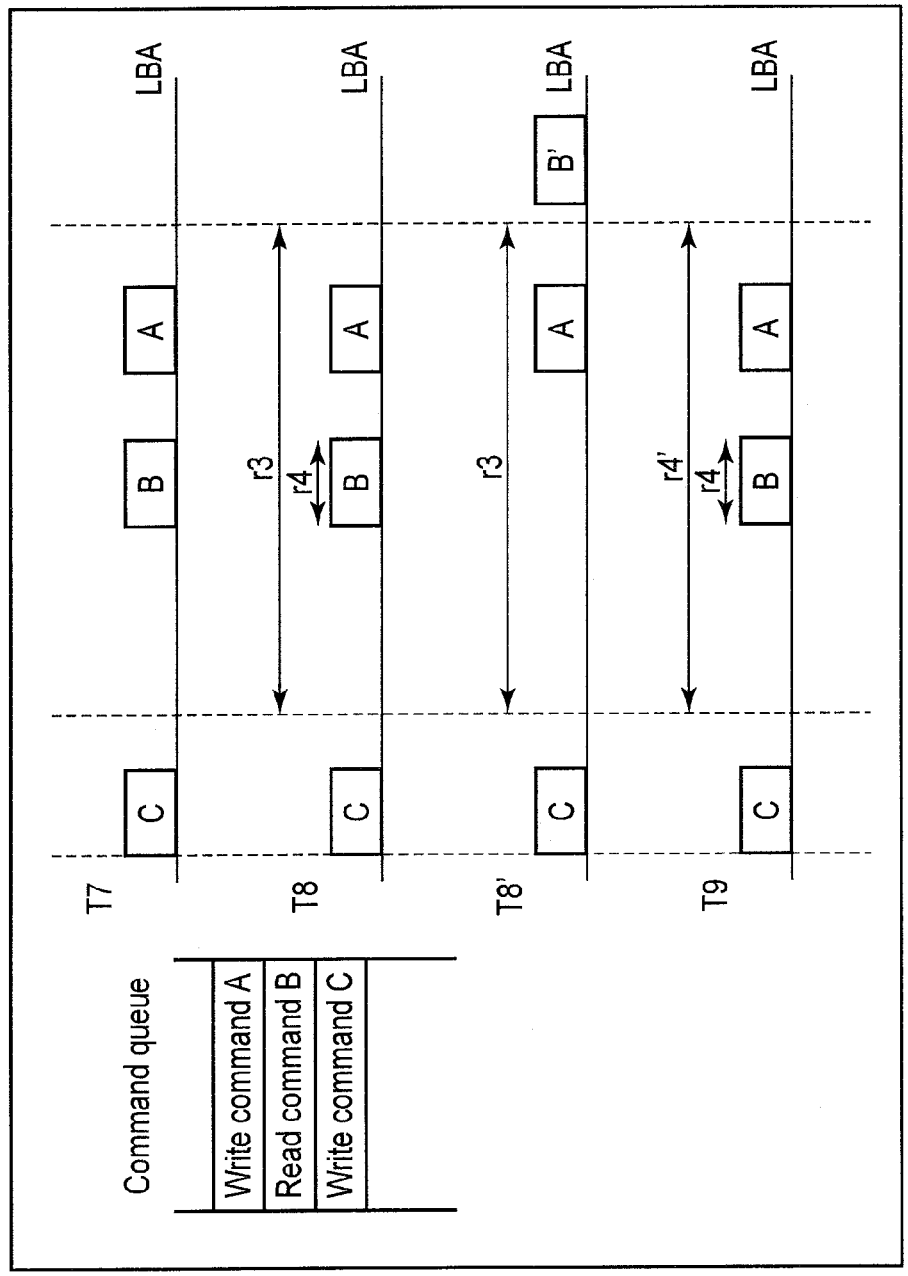
FIG. 8 is an exemplary view for explaining an overview of ATI measure processing according to a third embodiment.

An overview of the ATI measure processing according to the third embodiment will be described below with reference to FIG. 8.

Write command A, read command B, and write command C are stored in a command queue in this order.

T7 indicates a state before the commands in the command queue are executed.

T8 indicates a state when write command A is executed. T8 indicates a case in which a read command area r4 is included in a read verify scheduled area r3 where the read command is scheduled. Since write command A is executed, whether or not read verify is required can be estimated based on the write count record value 23b, when command C to be executed later in the command queue is executed.

T8' indicates a positional relationship between the read verify scheduled area r3 and command area B' under the assumption that command area B exists at a location (command area B') close to the read verify scheduled area r3. Even when the read command area is not included in the read verify scheduled area, as indicated by T8', the ATI measure processing according to the third embodiment can be executed.

T9 indicates an extended read command area r4' read command B upon execution of read command B. As indicated by T9, the extended read command area r4' of read command B corresponds to the read verify scheduled area r3.

As described above, according to the third embodiment, when the read verify is scheduled to be executed, and when a read command is required to be executed, a read command area is extended before the read verify is executed, thus executing the read processing of the read command and that of the read verify at the same timing. In this way, unnecessary processes in association with the read processing can be reduced.

Figure 9:
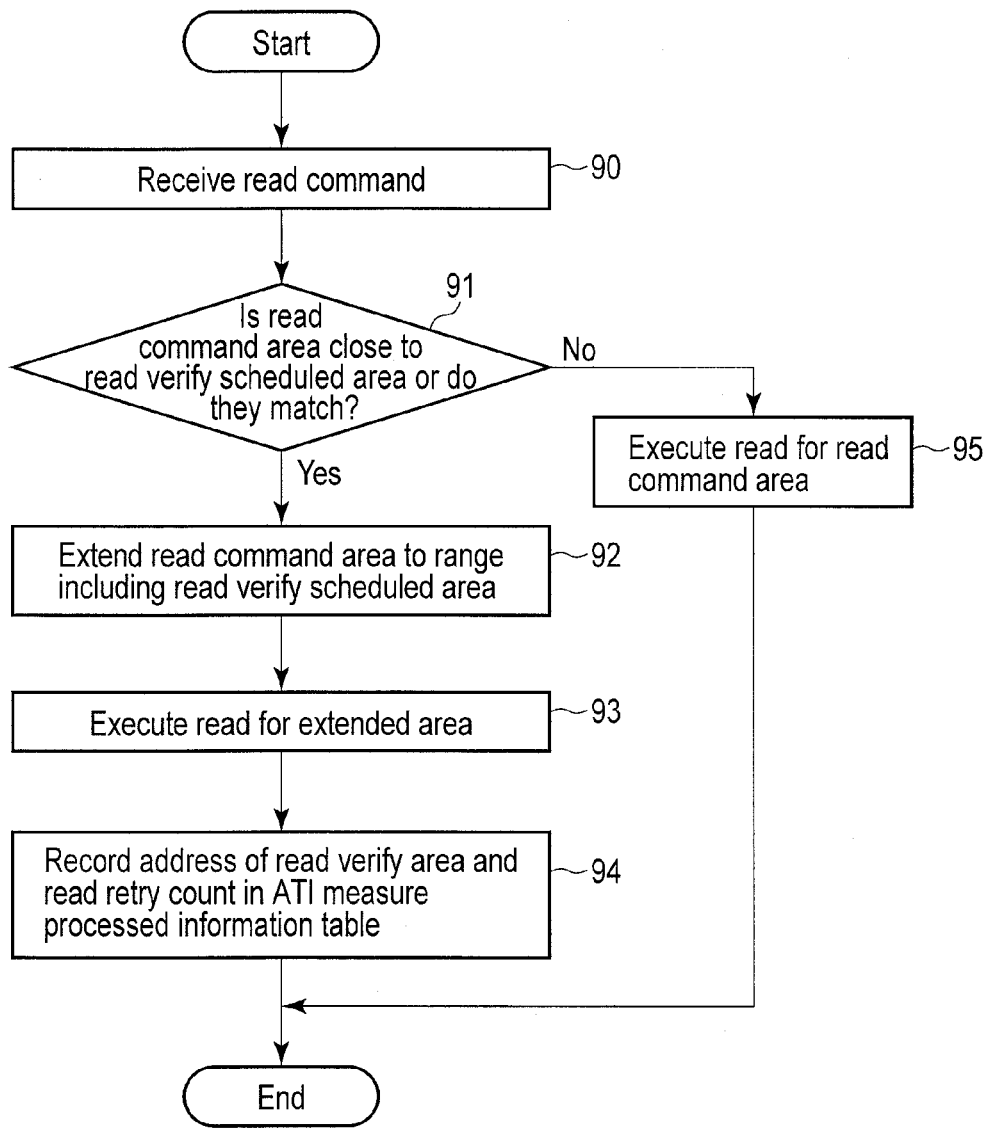
FIG. 9 is an exemplary flowchart showing an example of a read command processing sequence in the ATI measure processing according to the third embodiment.

The read processing according to the third embodiment will be described below with reference to FIG. 9. Note that in FIG. 9 it is shown processing upon execution of a read command when the read verify is required to be executed.

In block 90, a read command is received from the host system 20. It is checked in block 91 whether or not the received read command area is a read verify scheduled area or close to a read verify scheduled area. If the received read command area is not a read verify scheduled area or is not close to a read verify scheduled area, the process advances to block 95, and read processing is executed for the read command area.

If the received read command area is a read verify scheduled area or is close to a read verify scheduled area in block 91, the process advances to block 92. In block 92, the read command area is extended to an area including the read verify scheduled area. In block 93, read processing is executed for the extended area. In block 94, as an execution result of the read processing for the extended area, an address of a read verify area and a read retry count are recorded in a predetermined memory such as the ATI measure processed information table 23d. Note that the read retry count is a value used to determine whether or not a rewrite is to be executed in the read verify area, and is obtained based on, for example, a read error rate or the like.

In this way, by executing the read processing described above with reference to FIG. 9, when the read verify is required to be executed, a read command area is extended, thus efficiently executing the read processing and read verify in place of simple execution of the read processing according to a read command.

Figure 10:
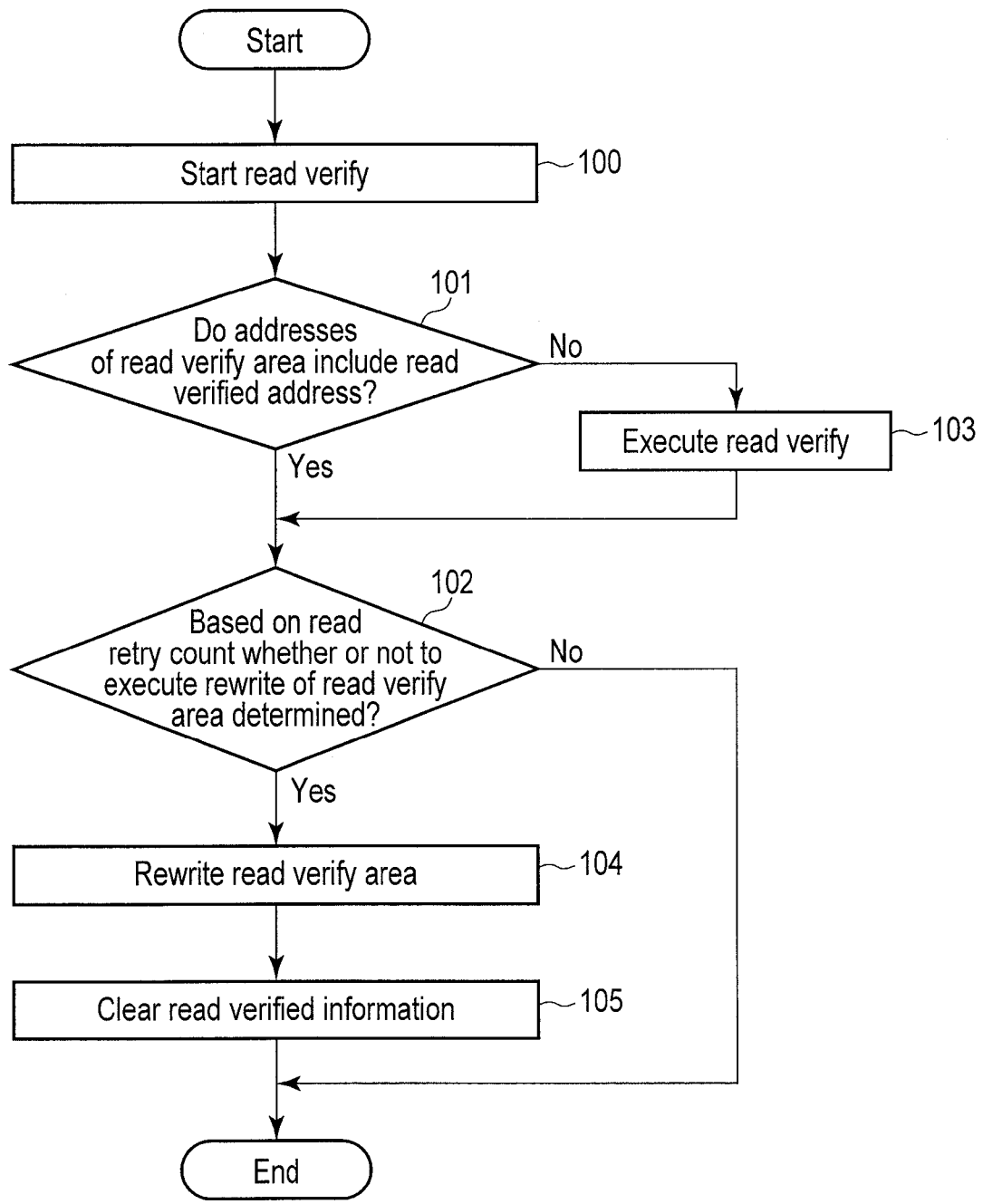
FIG. 10 is an exemplary flowchart showing an example of a read verify processing sequence in the ATI measure processing according to the third embodiment.

The read verify according to the third embodiment will be described below with reference to FIG. 10.

In block 100, the read verify is started. It is checked in block 101 whether or not an address of a read verify area is that of the read verify area written in the predetermined memory in block 94. If the address of the read verify area is that of the read verify area, it can be determined that an area to which the read verify is to be executed is the read verify area to which the read verify has already been executed since the read processing described above with reference to FIG. 9 was executed. If the address of the read verify area is not that of the read verify area, the read verify is executed for the read verify area in block 103.

It is checked in block 102 based on the read retry count as a result of the read verify whether or not a rewrite is required to be performed for the read verify area. Whether or not a rewrite is required to be performed for the read verify area is determined by comparing, for example, the read retry count and a predetermined threshold, and checking whether or not the read retry count exceeds the predetermined threshold. If the read retry count does not exceed the predetermined threshold, it is determined that data can be correctly read from the read verify area, thus ending the read verify.

If the read retry count exceeds the predetermined threshold in block 102, it is determined that the read verify area is an area which cannot be normally read, and the process advances to block 104. In block 104, data read in block 93 in FIG. 9 is rewritten in the read verify area. Next, in block 105, the preceding read verify result stored in the ATI measure processed information table 23d is cleared. The preceding read verify result is that of the read verify described above with reference to FIG. 9.

As described above, according to the third embodiment, the number of times of read verify to be executed can be reduced, and the read verify area can be small. For this reason, the access performance of the magnetic disk apparatus (especially, the processing performance associated with a read command) can be improved.

(Fourth Embodiment)

The fourth embodiment will be described below with reference to the drawings. Note that a description of the same components and functions as those in the first to third embodiments will not be repeated.

The first to third embodiments have been described under the assumption that the sole ATI measure processing is executed. In the fourth embodiment, an appropriate ATI measure process is selected from a plurality of ATI measure processes based on, for example, the positional relationship of command areas or the like.

Figure 11:
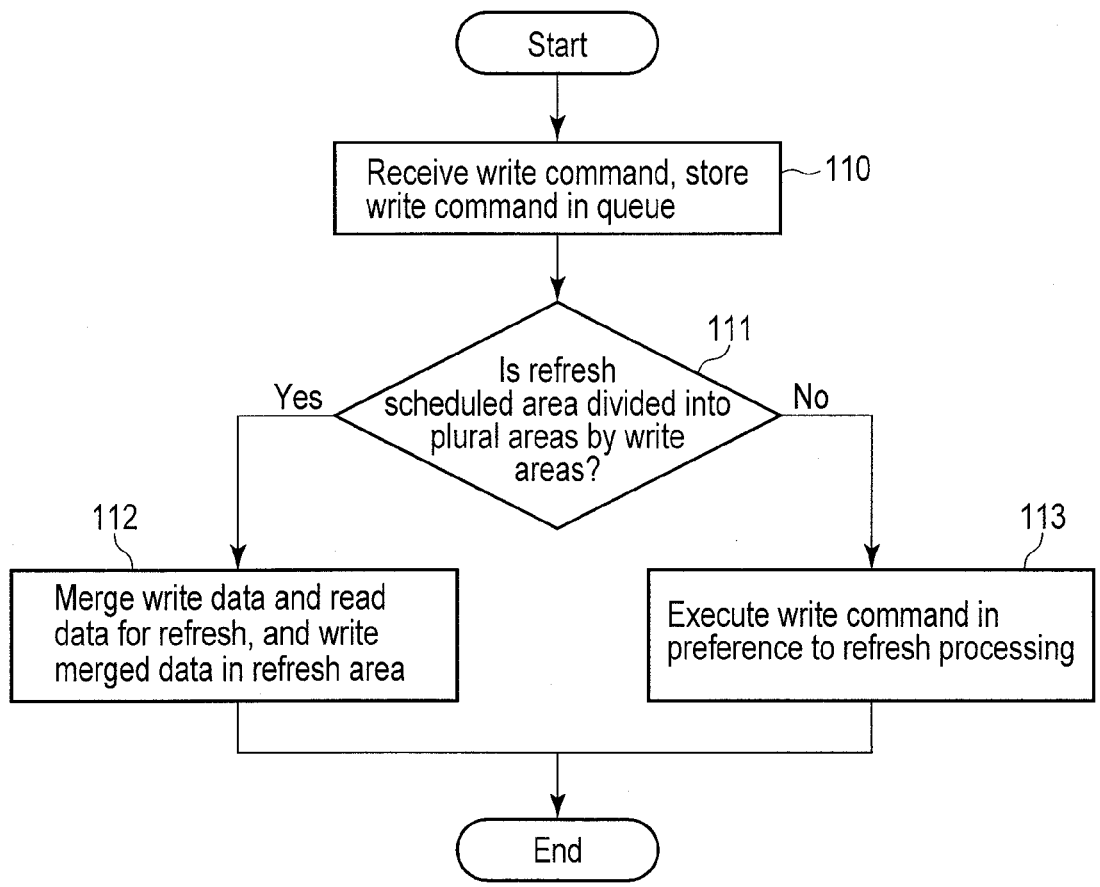
FIG. 11 is an exemplary flowchart showing an example of an ATI measure processing sequence according to a fourth embodiment.

The sequence for selecting appropriate ATI measure processing will be described below with reference to FIG. 11.

In block 110, the magnetic disk apparatus receives write commands, and stores the received write commands in a command queue.

In block 111, the write commands are read out from the command queue. It is then checked whether or not a refresh scheduled area is divided into a plurality of areas by write areas as shown in, for example, FIG. 6. If the refresh scheduled area is divided into a plurality of areas by write areas, write data and read data for refresh are merged, and the merged data is written in a refresh area in block 112. If the refresh scheduled area is not divided into a plurality of areas by write areas, the write commands are executed in preference to the refresh in block 113. Note that the processing in block 112 corresponds to the ATI measure processing described in the second embodiment. The processing in block 113 corresponds to the ATI measure processing described in the first embodiment.

In FIG. 6, note that the addresses of the plurality of write areas are not consecutive with each other, and the refresh scheduled area is divided into a plurality of areas by the write areas. For example, even when the addresses of the plurality of write areas are consecutive with each other, if the refresh scheduled area is divided into a plurality of areas by the write areas, the appropriate ATI measure process may be selected from the plurality of ATI measure processes described with reference to FIG. 11.

As described above, according to the fourth embodiment, by dynamically switching the plurality of ATI measure processes, the refresh can be executed more efficiently according to the positional relationship between blocks indicated by addresses of write areas compared to a case using the sole ATI measure processing.

In the aforementioned first to fourth embodiments, even when a state of the magnetic disk apparatus is not an idle state in which processing according to a write command, read command, or the like is not executed, the ATI measure processing can be executed without delaying the processing of the write command, read command, or the like and without lowering the processing performance of the write command, read command, or the like. More specifically, since the write command processing is executed while raising its priority, or since a write command execution area is excluded from the refresh target area, execution of the refresh upon execution of write processing to an area adjacent to the write command execution area can be suppressed.

Note that any of the first to third embodiments may be combined as embodiments. For example, by combining the first and second embodiments, when logical block addresses of write commands are consecutive with each other, the ATI measure processing of the first embodiment can be executed; when the addresses of write commands are not consecutive with each other, the ATI measure processing of the second embodiment can be executed. As another example, by combining the second and third embodiments, when a refresh area includes a read LBA and write LBA, read data for refresh is read in place of a read according to a read command, and read verify is executed using the read data for refresh. Furthermore, the read data for refresh and write data are merged, and the merged data is rewritten, thus executing the refresh and read verify processes as the ATI measure processing without lowering the performance associated with the command processing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A read/write apparatus comprising:
a command queue configured to store write commands;
a receiver configured to receive a first write command from the command queue; and
a refresh module configured to estimate a refresh scheduled area upon execution of the first write command, determine whether the refresh scheduled area includes a first area corresponding to a second write command, and adjust the refresh scheduled area based on the determination.

2. The apparatus of claim 1, wherein if the refresh scheduled area includes the first area, the refresh module is further configured to execute the second write command, and then execute a refresh processing with respect to the refresh scheduled area except the first area.

3. The apparatus of claim 1, wherein if the refresh scheduled area includes the first area, the refresh module is further configured to read data from the refresh scheduled area, merge data to be written to the first area into the read data from the refresh scheduled area, and write the merged data to the refresh scheduled area.

4. The apparatus of claim 1, wherein the command queue is further configured to store a read command, and
the refresh module is further configured to determine whether the refresh scheduled area includes a second area corresponding to the read command, and if the refresh scheduled area includes the second area, the refresh module is further configured to execute the read command.

5. The apparatus of claim 4, wherein the refresh module is further configured to determine whether or not the read data is to be written to the refresh scheduled area, based on a read retry count.

6. The apparatus of claim 1, further comprising a checking module configured to check whether or not the refresh scheduled area comprises divided areas,
wherein the refresh module is further configured to select, based on a checking result of the checking module, whether the refresh module executes the second write command and then execute a refresh processing with respect to the refresh scheduled area except the first area, or the refresh module merges data to be written to the first area into the read data from the refresh scheduled area and writes the merged data to the refresh scheduled area.

7. A read/write method comprising:
storing write commands in a command queue:
receiving a first write command from the command queue;
estimating a refresh scheduled area upon execution of the first write command;
determining whether the refresh scheduled area includes a first area corresponding to a second write command; and
adjusting the refresh scheduled area based on the determination.

8. The method of claim 7, further comprising:
executing a second write command if the refresh scheduled area includes the first area; and
executing a refresh processing with respect to the refresh scheduled area except the first area.

9. The method of claim 7, further comprising:
reading data from the refresh scheduled area if the refresh scheduled area includes the first area;
merging data to be written to the first area into the read data from the refresh scheduled area; and
writing the merged data to the refresh scheduled area.

10. The method of claim 7, further comprising:
storing a read command in the queue;
determining whether the refresh scheduled area includes a second area corresponding to the read command; and
if the refresh scheduled area includes or is e ual to the second area, executing the read command.

11. The method of claim 10, further comprising:
determining whether or not the read data is to be written to the refresh scheduled area, based on a read retry count.

12. The method of claim 7, further comprising:
checking whether or not the refresh scheduled area comprises divided areas,
selecting, based on a checking result of the checking, whether the controlling executes the second write command and executes a refresh processing with respect to the refresh scheduled area except the first area, or the controlling merges data to be written to the first area into the read data from the refresh scheduled area with and writes the merged data to the refresh scheduled area.

* * * * *